United States Patent [19]
Vis

[11] 3,842,744
[45] Oct. 22, 1974

[54] SYSTEM FOR CONTROLLING THE MOVEMENT OF A VEHICLE OR OBJECT ALONG A PATH

[76] Inventor: Willem Leyzers Vis, 16, Drechtstraat, Leiden, Netherlands

[22] Filed: Feb. 21, 1973

[21] Appl. No.: 334,429

[30] Foreign Application Priority Data
Feb. 21, 1972 Netherlands .................. 7202261

[52] U.S. Cl. .................................. 104/88, 246/25
[51] Int. Cl. ............................................. B61l 1/08
[58] Field of Search ............... 104/88, 153; 246/25

[56] References Cited
UNITED STATES PATENTS
| | | | |
|---|---|---|---|
| 2,877,718 | 3/1959 | Mittag | 246/25 |
| 3,169,733 | 2/1965 | Barrett, Jr. | 104/153 |
| 3,227,096 | 1/1966 | Gorjanc | 246/25 |
| 3,340,821 | 9/1967 | Wesener | 104/88 |
| 3,440,972 | 4/1969 | Sidebotham et al. | 104/88 |

Primary Examiner—M. Henson Wood, Jr.
Assistant Examiner—George H. Libman
Attorney, Agent, or Firm—Watson, Cole, Grindle and Watson

[57] ABSTRACT

A system for controlling the path of a vehicle to a predetermined, coded, destination with code scanning switch members on the vehicle and activating members along the path, the scanning switches being connected to the inputs of selecting switches and to memories controllable by a control signal through the scanning switches and in combination constituting a path control circuit, the outputs of the selecting switches being supplied with the control signal.

16 Claims, 6 Drawing Figures

SYSTEM FOR CONTROLLING THE MOVEMENT OF A VEHICLE OR OBJECT ALONG A PATH

DISCUSSION OF THE PRIOR ART

The invention relates to a system for controlling the direction to be taken by a vehicle or object movable along a path. In a known system for this purpose the vehicle carries at least two code scanning switch members situated in juxtaposition transverse to the direction of movement of the vehicle or object. The switch members are coupled to selecting switches, in conformity with a code determining the direction to be taken, and are capable of forming a control circuit which can supply a path-controlling signal, in response to a particular combination of code activating members, arranged in juxtaposition, transverse to the direction of movement of the vehicle or objects along the path, and which influence the code scanning members.

In this known system every destination for a vehicle or an object is characterized by a member converted into a binary code, the code being set by means of a number of two-position switches. Via the two position switches, the scanning switch member, having an input contact and two output contacts, can close a control circuit via which the path control signal can be generated. The switch members are controlled by magnets.

This known system has drawbacks. A complication is that any decimal number, indicating a destination, must firstly be converted into a binary code before the setting on the vehicle or object can be effected. Due to the simultaneous scanning of all switch members, which moreover, can assume two positions, the control of the switch members results in heavy requirements on the members, which leads to the use of a great number of activating members (magnets). This is a major inconvenience. Moreover, for the coding of a greater number of stations a great number of juxtaposed switch members (usually reed-contacts) and corresponding rows of activating members are required. The scanning switch members employed should be of the type with change contacts which, as a consequence, are more expensive than switch members with working contacts. Finally this known system does not permit the realization of special functions in a device equipped therewith.

SUMMARY OF THE INVENTION

It is an object of the invention to provide a system of the above mentioned kind, but of greater application and which can be adapted, at will, to large or small apparatus, which can be used with paths of different kinds, and which in practice, can be handled with ease. According to one aspect, the invention provides a system for controlling the direction to be taken by a vehicle or object movable along a path, wherein the vehicle carries at least two code scanning switch members situated in juxtaposition transverse to the direction of movement of the vehicle or object. The code scanning switch members are coupled to selecting switches, in conformity with a code determining the direction to be taken, and are capable of forming a control circuit which can supply a path-controlling signal in response to a particular combination of code activating members, arranged in juxtaposition, transverse to the direction of movement of the vehicle or object along the path, and which influence the code scanning members.

Each of the code scanning switch members is connected with the input of a selecting switching system having various outputs, and with a memory member arranged to change over from a first condition to a second condition under the influence of a memory control signal supplied via the respective code scanning switch member and the selecting switching system. Thereby, when all the memory members, which in combination constitute the control circuit are in the second condition the path control signal will be produced, while the mutually corresponding output connections of the several selecting switching systems are through connected and, via position scanning switch members, are coupled to a memory control signal source. The position scanning members are arranged in such a way with respect to the code scanning members that, on consecutively moving the code scanning switch members past the code activating members, the position scanning switch members will be consecutively influenced by at least one position activating member which will be provided along the path in addition to the code activating members.

With the system of the invention the code, characterizing the destination, is set on the object or vehicle by means of the various selecting switching systems and the code activating member positions are consecutively scanned for the presence of activating members. Simultaneously therewith, via the position scanning switch members, potential is applied to the corresponding outputs of the selecting switching systems. Only when the code set in the selecting switching system corresponds with the way in which activating members are placed in the corresponding code positions will a path control signal be generated.

In order to reset the memories, possibly changed over to the second condition, to the first condition, the invention ideally provides that before the position scanning switch members, as defined by the direction of movement of the vehicle or object, an additional reset scanning switch member is arranged which is coupled to a source for a memory reset signal.

Although in principle, an arbitrary coding is possible the stations are preferably identified in a decimal code, the number of code scanning switch members corresponding with the number of code decimals used. The generated path-controlling signal acts preferably upon a member which determines whether or not the vehicle or object is to branch off at a turning point in the path.

Preferably an additional code-scanning switch member is provided which, is coupled to the output of one of the positioning scanning members and to at least one memory member, which is arranged to be operated by an additional code activating member which will be disposed along the path. This feature is advantageous in that it is possible to achieve, by means of only one additional activating member, that one or more memory members changes over to the second condition, which simplifies the coding to be provided along the path since it now is possible to obtain for a group of destinations, at a particular point, a forced branching off without it being necessary to indicate all the destinations of the groups separately.

This system may be modified as will appear from the description hereinafter, to offer the possibility of realising a number of extra functions, whereby the practical usefulness of the system is considerably enhanced.

Thus for instance, it is advantageous to be able in particular cases to change the set coding of the destination automatically into a predetermined particular fixed destination. For that purpose that contact of each code scanning switch member, which is not connected with the memory, may be connected with the input of a "program change-over switch" having two outputs, the first of which is connected to the corresponding input of the selecting switching system, and the second to one or more arbitrarily to be selected outputs thereof.

The change-over operation can be performed in response to an insufficient charge condition of the battery or to the sensing of the setting of the vehicle or object to a non-existing destination. The latter is realized by means of an additional scanning switch member disposed, in the direction of movement before the code scanning switch members, which, in combination with one of the position scanning switch members, can constitute a control circuit in order to bring the program change-over switch into the second position when the three memory members are in the second condition. Such an arrangement will then respond to a special disposition of position activating members indicating all the non-existing stations.

It is also possible to achieve this by using means responsive to the opening of a cargo space in the vehicle which means is active in such a way as to cause the program change-over switch to be brought into and held in the second position.

In a preferred embodiment of the memory members each code memory member is constituted by a polar relay with two exciting windings, the first exciting winding of each polar relay being connected, via the respective code scanning switch members, to the input of the selecting switching system. The second exciting windings are mutually connected in parallel and connected with the reset scanning switch member, while the code scanning switch member relay contacts are series connected to constitute the control circuit.

The space occupied by the system of scanning switch members can be limited by providing that the position scanning switch members are arranged in two rows which are situated beside each other so as to be able to cooperate with two position activating members, which will be arranged in staggered relationship along the path.

The activating members are ideally constituted by permanent magnets and the scanning switch members by magnetically controllable switches. These are preferably of the type of which the contacts are open in the absence of an influencing magnetic field.

The invention is also applicable to a conveyor track for goods, to be used in combination with a vehicle provided with a system as described hereinbefore, and incorporating switch points, before which, as defined by the direction of movement of the vehicle, are provided plates having a number of coding and positioning magnet actuating members, the mutual spacing of which corresponds with that of the scanning switches on the vehicle. Such a conveyor track is preferably provided with a central station along which current carrying rails are arranged which cooperate with sliding contacts, connected with a supply battery on the vehicles.

The invention may be practiced in various ways.

DESCRIPTION OF A PREFERRED EMBODIMENT

The embodiment to be described relates to a device for internal transport of post or goods, for example, in an office building. For that purpose a stationary path, with rails, extends through the building, along which trolleys, carrying a cargo compartment, can travel. At a central station at which the cargo compartment of the trolley is filled, the destination of the trolley is determined by adjustment of setting members, to be described hereinafter in a decimal code whereupon the trolley moves along the path to its destination.

A number of switch points are disposed in the path; the normal position is the straight-on direction, but the trolley can in a way to be described later, change the position of a switch point, by means of a control signal, so that the trolley then turns off. The branchings along the path are closed loop lines, and each loop line incorporates a station.

It is provided that a trolley arriving at a particular station stops automatically at a desired location, whereupon the cargo can be discharged and a new destination can be set on the trolley.

The path to be followed by a trolley is in fact determined by deciding whether at a switch point the trolley should deviate from the straight path or not. For that purpose a system is used of permanent magnets disposed according to a particular pattern in the vicinity of the path, the magnets cooperating with a number of magnetically controllable switches carried by the trolley, these switches being the well-known reed-switches. The permanent magnets constitute the activating members mentioned hereinbefore; the reed switches constitute the scanning switch members.

Figure 5A:
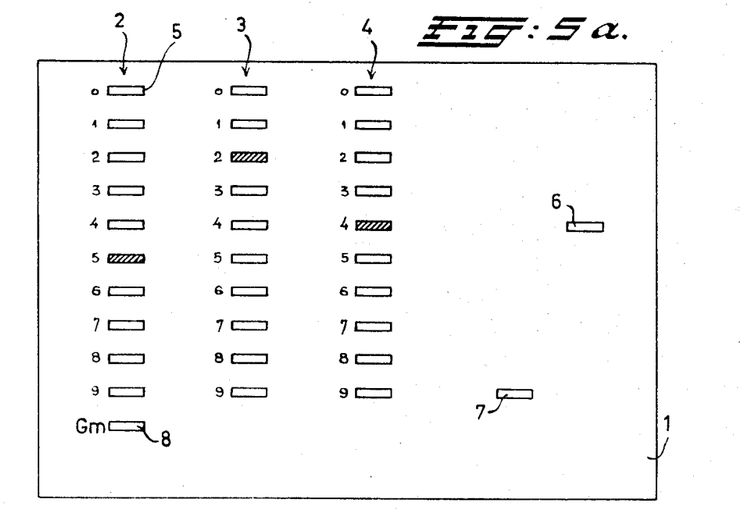
FIG. 5a is a plan view of a plate carrying the operating magnets.

The permanent magnets are arranged in a number (e.g. three) mutually parallel rows, each row having ten magnet positions, situated under one another, in which a magnet lying transverse to the longitudinal direction of the path, or no magnet, can be placed; apart therefrom there are two so-called positioning magnets the purpose of which will be clarified hereinafter, while individual magnets may be used for other purposes. FIG. 5a shows a plan view of a magnet carrying plate 1, to be disposed in the vicinity of the path; this plate has magnet-accommodating openings (magnet-positions) arranged in rows 2, 3 and 4. In row 2 such an accommodating opening is denoted by the reference numeral 5. There are further positions, at special locations, to be described hereinafter, for two magnets 6 and 7. The magnet 6 is always present, the magnet 7 is only present in apparatus with more than 500 destinations. Row 2 comprises at its lower end an additional magnet accommodating opening 8. The indication of a particular destination of a trolley is effected by means of a decimal code with three decimals; every destination is, in the present example, identified by a number of three ciphers. It is obvious that, when there is a smaller number of destinations, it suffices to use a decimal code with two ciphers, or when there are more destinations a decimal code with four ciphers. In this embodiment the column 4 serves to identify the hundreds, column 3 to identify the tens, and column 2 to identify the units of the figure representing the destination. FIG. 5a shows an example in which the magnet carrying plate is programmed for the number 425. At the locations whereat a magnet is situated the position concerned in the column has been hatched.

Figure 1:
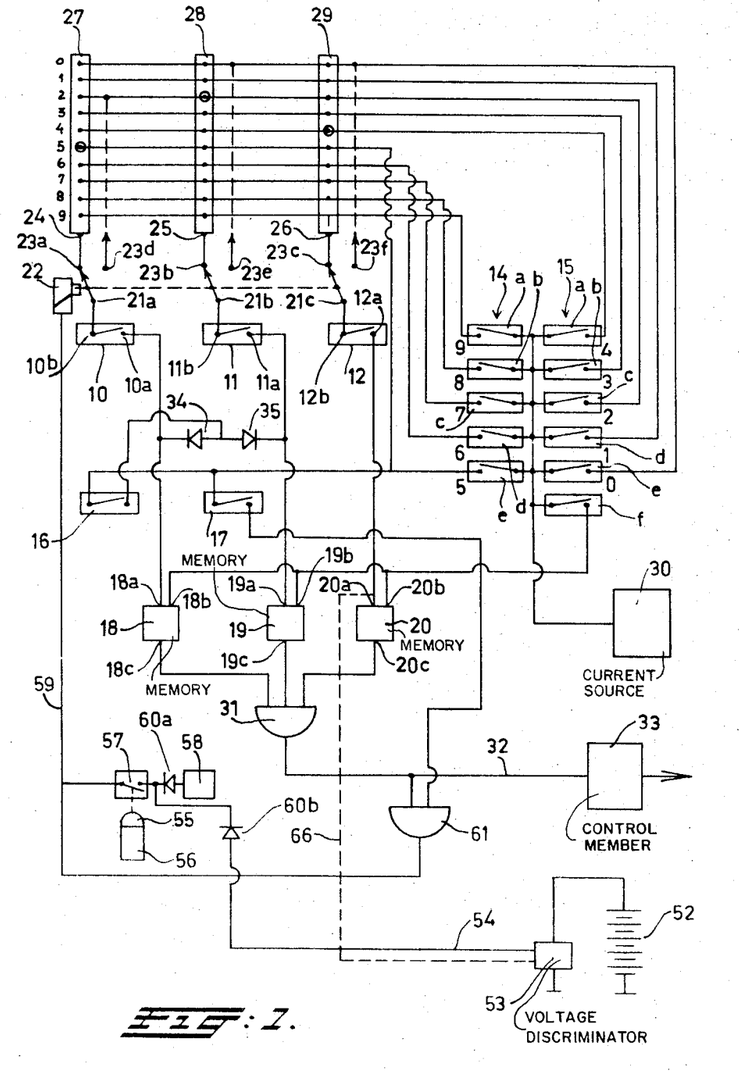
FIG. 1 is a circuit diagram showing connections in an electronic section in a vehicle or member, according to the invention.
Figure 4:
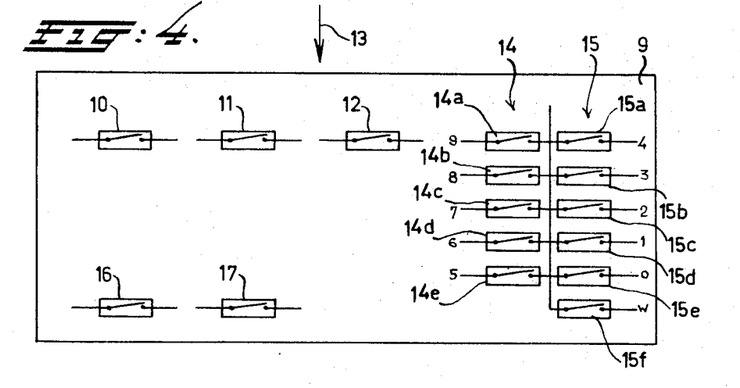
FIG. 4 shows diagrammatically the arrangement, with respect to each other, of magnetically-operated switches used in the embodiment according to FIG. 1.

FIG. 4 shows a plate 9 carrying a number of reed-switches and which is destined to be mounted on the trolley in combination with the switch circuit according to FIG. 1. This switch plate 9 cooperates with a magnet-carrying plate 1. The magnet-carrying plate 1 is disposed on the rails and the plate 9 with the reed-switches is disposed on the bottom of the trolley in such a way that, on passing the magnets, the reed-switches will be influenced thereby. The switches are normally open and close temporarily when a magnet passes by.

The plate 9 carries three juxtaposed reed-switches 10, 11, 12, the mutual spacing of which in the direction perpendicular to the direction of advance of the trolley (which is indicated by the arrow 13) being equal to the mutual spacing of the rows of magnet positions, 2, 3 and 4 in FIG. 5. Beside the reed-switch 12 are two rows of reed switches 14, 15 respectively; the row 14 having the switches 14a to 14e inclusive and the row 15 having the switches 15a to 15f inclusive. As shown in a direction transverse to the direction of advance and in line with the switch 15f there are two switches 16 and 17, the function of which will be clarified hereinafter.

The circuit diagram of FIG. 1 shows that reed switch contacts 10a, 11a, 12a are respectively connected to setting inputs 18a, 19a, 20a of respective memory members 18, 19, 20. Each memory member has a reset input 18b, 19b, 20b, these reset inputs being mutually through-connected with the reeds switch 15f. The reed switch connections 10b, 11b, 12b are respectively connected with a change-over contact of a two-position switch 22, the left hand contacts 23a, 23b, 23c of which are each connected with an input 24, 25, 26 respectively of a 10 position selector switch 27, 28, 29. Each of the right hand contacts 23d, 23e, 23f is connected, as is indicated by the dashed lines, to a particular output contact of the associated selector switch 27, 28, 29 for a purpose to be further described.

The corresponding outputs of the switches 27, 28, 29 indicated in FIG. 1 by the numbers 0 to 9 inclusive are mutually through-connected and further connected with a contact of one of the reed-switches 14a, to 14e inclusive, and 15a to 15e inclusive, and the other contacts on these reed-switches are mutually through-connected and connected with a current source 30. Control potential, provided by the current source 30, can be impressed via the reed switches 14a to 14e, 15a to 15e onto the outputs of the selector switches 27, 28, 29 and with the switch 22 in the depicted position in dependance of the adjustment of these selector switches 27, 28, 29 onto the contacts 10b, 11b, 12b of one of the reed-switches 10, 11 and 12. Then when one of the reed-switches 10, 11, 12 is closed, the control potential is impressed onto an input 18a, 19a, 20a of one of the memory members 18, 19, 20 with the result that the memory is brought from a first into a second condition. When the reed contact 15f closes, the same potential from source 30 is applied to all the reset inputs 18b, 19b, 20b of the memory member 18, 19, 20 so that all return to the first condition.

The outputs 18c, 19c, 20c of the memory members 18, 19, 20 are connected to an AND-gate 31, which when all three inputs are excited, applies a control signal, via the connection 32, to the control member 33 which determines whether switch points, which are approached by the trolley, are brought into the position "branch" or not. The control member 33 may for example, be an electromagnet, which, in the excited condition, causes a pin to protrude from the trolley, which cooperates with a mechanical scanner along the path in order to move the points from the position "straight on" to the position "branch." The control member may alternatively be an electrical or electronic circuit which applies a particular potential to sliding contacts which cooperate with scanning rails along the path. When, via the connection 32 a control signal is applied to the member 33, the latter ensures that the next pair of points to be encountered in the path by the trolley is brought in the condition "branch."

The principle is therefore that a point is thrown over to the position "branch" when all memory members 18, 19, 20 have been put into the second operative condition, which is the case when all three reed-switches 10, 11 and 12 have been closed at moments at which the potential of the source 30 was applied to the selected contacts of the selector switch 27, 28, 29 respectively. This is the case when controlling potential is applied, via one of the reed contacts 14a to 14e, 15a to 15e to the output of the selector switch to which the movable contact thereof is set.

The magnet positions of the three rows 2, 3 and 4 are consecutively scanned by the reed switches 10, 11 and 12; evidently when one of the reed-switches 10, 11 or 12 moves over a permanent magnet in one of the rows 2, 3 and 4 the reed-switch concerned will close, but only then when the associated selector switch 27, 28, 29 has been adjusted to the position corresponding to the magnet position concerned with controlling potential to be supplied, via the associated reed-switch, to the associated memory 18, 19 or 20. The consecutive excitation of the outputs is achieved due to the cooperation of the reed-switches 14a to 14e, 15a to 15e with the permanent magnets 7, 6 respectively.

Figure 3:
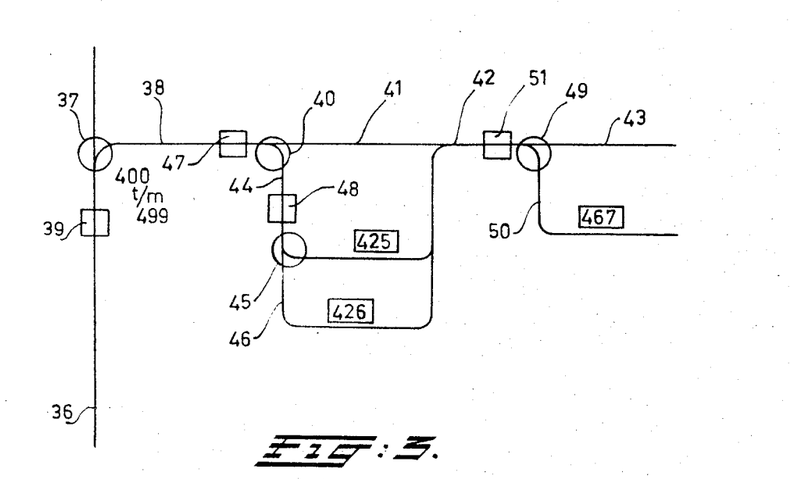
FIG. 3 shows diagrammatically a part of a vehicle path with branches and a station.

FIG. 3 shows a magnet carrying plate 48, of the type denoted by the reference numeral 1 in FIG. 5a, disposed along the path before a switch point 45 leading to a station, indicated by the number 425. In the plate 1 of FIG. 5a the row 4 of the hundreds has been filled at the position 4, in the row 3 of the tens the position 2 has been filled and in the row 2 of the units the position 5 has been filled.

The selector switches of a trolley which should move towards this station are adjusted as follows: the switch 29 of the hundreds in the position 4, the switch 28 of the tens in the position 2 and the switch 27 of the units in the position 5. In FIG. 1 this is indicated with circles around the outputs concerned.

If the FIG. 4 is copied onto transparent paper and moved over FIG. 5 a clear picture is obtained of the mutual positions of magnets and switches obtained when a tolley with the plate 9 moves over a magnet carrying plate 1.

Before the switch point 45 (FIG. 3) leading to the part of the track on which is situated the station 425 is reached, the following occurs:

When a plate with reed-switches like the plate 9 (FIG. 4) moves over a magnet-carrying plate like the plate 1 (FIG. 5a) the switch 15f will at first pass the magnet 6. The reed-switch (15f) closes and as a consequence potential from the source 30 is impressed to the reset inputs 18b, 19b, 20b of the memory members 18, 19 and 20. All three memory members return thereby to the initial first condition.

Thereafter the reed-switch 15e passes the permanent magnet 6. The reed switch 15e closes and as a consequence potential from the source 30 is applied to all outputs "0" of the switches 27, 28 and 29. Simultaneously the reed-switches 10, 11 and 12 are over the magnet positions "0" of the rows 2, 3 and 4; there is however, no magnet present so that the switches will not close. If one of the switches 27, 28, or 29 should have been adjusted to the position "0" which could be the case with a trolley with a destination other than the station 425, no potential would be applied to one of the associated memory members since none of the switches 10, 11 and 12 close.

The same happens in relation to the position "1;" the reed-switch over the magnet 6 closes and impresses potential to all outputs 1; none of the switches 27, 28, 29 is however, adjusted in the position 1 nor is any magnet situated in any of the positions of the rows 2, 3 or 4.

Thereupon the reed-switch 15c comes over the magnet 6. As a result potential is applied to all outputs "2" of the three switches 27, 28 and 29. The switches 28 is adjusted to the position "2" while in the magnet position "2" of row 3 a magnet has been inserted; the reed-switch 11 closes; via the reed-switch 15e, the output contact 28, and the reed-switch 11, potential is applied to the input 19a of the memory 19 which changes over to the second condition.

In row 4, that of hundreds, the position 4 is filled, the switch 29 is in the position 4 and when the reed-switch 15a passes the magnet 6 potential will be applied, via the switch 29 and the reed-switch 12 then closing, to the input 20a of the memory member 20 which changes over to the second condition. As to the units, the position 5 in the row 2 contains a magnet. This means that, since the switch 27 is set in the position 5, the memory member 18 is also excited, via the reed-switch 14e activated by magnet 7, position 5 of switch 27 and the closing of reed-switch 10.

Now all three memories are excited; so potential is applied to the control member 33 with the result that, as described hereinbefore, the points 45 concerned are thrown over and the trolley turns off toward the station 425.

The foregoing shows how the consecutive magnet positions 0 to 9 inclusive of the rows 2, 3 and 4 are simultaneously and successively scanned by the reed contacts 10, 11 and 12, while due to the cooperation of the reed contacts 14a to 14e, 15a to 15e respectively with the magnets 6, 7 respectively, potential is successively applied to the outputs of the selector switches 27, 28 and 29. Only when for each row there is conformity between the magnet position located in the row and the adjusted position of the switches 27, 28 and 29 are all three memory members 18, 19 and 20, caused to change to the second condition so that the AND gate 31 becomes conductive and operates the control member 33, which ensures that the points leading to the desired station are thown over. Arrangements are made in such a way that this pair of points returns to the position "straight on" when the trolley has passed.

It appears from the foregoing that the system according to the invention can be extended in a simple way to have a greater capacity; the addition of one reed contact, one selector switch and one memory member increases the capacity from 1,000 station to 10,000 stations.

With the arrangement it is possible to achieve the result, by using one additional magnet position that all trolleys destined for stations defined by a number within one or more groups of hundreds turn off at a particular point. This requires one additional reed switch (the switch 16), and one additional coding magnet position, namely the magnet position denoted by 8 in FIG. 5a, to be indicated as "group magnet" Gm. The switch 16 is connected with the output contact of the reed-switch 14e and, vai the two diodes 34 and 35, with the inputs 18a and 19a of the memory member 18 and 19 belonging to the units and the tens respectively.

FIG. 3 shows how, with this arrangement, a particular programming can be realized in a simple way. The Figure shows a straight part 36 of the track with switch point 37 leading to a part 38 of the track on which are situated a number of stations of which the code numbers range from 400 to 499. A magnet carrying plate 39 has been disposed before the switch point 37, the magnet position 4 in the row 4 and the magnet position Gm at the foot of row 2 being filled. The magnet Gm in row 2 cooperates with the reed-switch 16 so that when the switch plate of the trolley, having selector switches which are adjusted to a destination between 400 and 499, the switch 29 of which being at any rate is in the position 4, passes the magnet carrying plate, the following happens:

When the reed-switch 12 of the hundreds passes the magnet position 4 the memory member 20 is brought into the second condition, since then, via the reed-switch 15a at that moment passing the magnet 6, the switch 29 and the closing reed-switch 12, potential is applied to the input 20a of this memory member. Independently of the position of the switches 27 and 28 potential will be applied, when the reed-switch 16 passes the magnet position Gm in column 2, via the diodes 34, 35 to both the inputs 18a, 19a of the memories 18 and 19. In this situation all three memories are set into the second condition; thus via the AND gate 31 the control member 35 is excited and the points 37 are brought to the position "branch."

In the example according to FIG. 4 switch point 40 is at the end of the portion 38 of the track and next in line thereto are the straight parts 41, 42, 43 of the track. The part 44 of the track turning off from the switch point 40, leads, via the switch point 45, to a station 425; straight on, the part 46 leads to the station 426. In the magnet carrying plate 47 disposed before the switch point 40 are now completed the position 4 in the row 4, the position 2 in the row 3 and both the positions 5 and 6 in the row 2. This means that trolleys of which the selector switches are set at 425 and 426 will bring the switch point 40 to the "branch" position. Before the switch point 45 lies the magnet carrying plate 48 which is completing the position 4 of the row 4, the position 2 of the row 3 and the position 5 of the row 2. Only trolleys destined for the stations 425 and 426 can get on the part 44 of the track; a trolley coded at 425, the coding of which therefore corresponds with the positions of the magnets in a magnet carrying plate 48, will bring the switch point 45 in the "branch" position so that this trolley arrives at the station 425. A trolley coded at 426 does not influence the switch point 45, travels straight on on the part 46 of the track, and arrives automatically at the station 426.

FIG. 3 shows yet another switch point, namely the switch point 49 from which the branching 50 leads to station 467. A magnet carrying plate 50 is disposed before the points 49 and in this plate the position 4 in row 4, the position 6 in row 3 and the position 7 in row 2 are filled. All trolleys of which the selector switches are set at 467 cause the switch point 49 to move into the "branch" position, so that such trolleys go to the station 467 on the part 50 of the track.

The apparatus is constructed so that, irrespective of the position of the switches 27, 28 and 29, the setting of the destination of a trolley may be modified in such a way that it will always move toward a particular station, e.g., the central postal department in an office building. For that purpose the changeover switches 21a, 21b, 21c are provided; they are controlled by the control member 22 (e.g., a relay with a holding contact), which operates as a memory.

In the left position, of these switches, shown in FIG. 1, the reed-switches 10, 11 and 12 are connected with the inputs 23a, 23b, 23c of the selector switches 27, 28 and 29. When the switches 21a, 21b, 21c assume the right hand position, the reed-switches are connected with the contacts 23d, 23e, 23f, which can be connected with particular, predetermined selected outputs of the switches 27, 28 and 29. When this is the case the position of the switches 27, 28 and 29 will no longer influence the path to be followed by the trolley; the destination of the trolley is exclusively determined by the fixed connections which are established between the contacts 23d, 23e, 23f and the selected output contacts of the switches 27, 28, 29. FIG. 1 shows the situation in which the contact 23d is connected with the output contact 2 of the switch 27 and the contacts 23e, 23f are both connected with the output contact 0 of the switches 28, 29 respectively. When the switches 21a, 21b, 21c are in the right hand position the trolley is set to the destination 002. This may be the central postal department where also, when the current for the motor of the trolley is supplied by a built-in battery, a charging device for this battery, denoted by 52 in FIG. 1 is provided.

Hereinafter three cases will be described in which the original setting of the destination of a trolley is changed over to the destination 002.

1. Trolleys which are destined to return always to the postal department. When one wants to be sure that a particular member of trolleys is always available at the postal department a number of trolleys can be modified in such a way that, after having arrived at a particular station and the cargo compartment having been opened, they thereupon automatically receive the destination 022. This is effected as follows:

The cover 55 of the compartment 56, diagrammatically represented in FIG. 1, of each trolley is coupled to a switch 57. The trolleys belonging to the "stock" incorporate a control circuit, e.g., a voltage source 58 with the diode 60a, while the switch 57, via the connection 59 is connected with the control member 22. When, at the destination of such a trolley, the cover 55 of the body is opened, the switch 57 closes, the control member 22 is excited and the switches are brought to the right hand position. The trolley is now automatically set at the destionation 002 independent of the setting which a user gives to the switches 27, 28 and 29.

2. Battery 52 insufficiently charged.

The charge of the battery 52 is sensed by means of the battery voltage discriminator 53. When the voltage of the accumulator falls below a predetermined level, indicating the accumulator 52 is becoming exhausted, the discriminator circuit 53 applies a voltage, via the connection 54, and the diode 60b, to a contact of the switch 57. When the trolley is at its destination and the cover is lifted, the control member 22, for the switches 23a, 23b, 23c is excited via the switch 57. Irrespective of what has been set by the user, the trolley is set to the destination 002 and returns automatically to the postal department, which is the battery charger. In this way a trolley with an exhausted battery does not stop somewhere on the track.

3. This case relates to the sorting out of trolleys of which the selector switches are set to a number which does not belong to an existing station. The system described has the possibility of setting to 1000 stations; it is evident that there are many buildings in which there are not 1000 stations. If then a user should set the switches 27, 28, 29 to a non-existing destination, this trolley would aimlessly run about until its battery was exhausted. This is prevented by the following measures:

Arranged on line with the reed-switches 16 there is the reed-switch 17 of which the input contact is likewise connected with the reed-switch 14e and the other contact of which is connected with an input of an AND gate 61 with two inputs, the other input of which is connected with the output of the AND gate 31. The output of the AND gate 62 controls the control member 22 in such a way that when the output of the AND gate 61 supplies a signal, the switches 21a, 21b, 21c are brought into the right hand position.

Figure 5B:
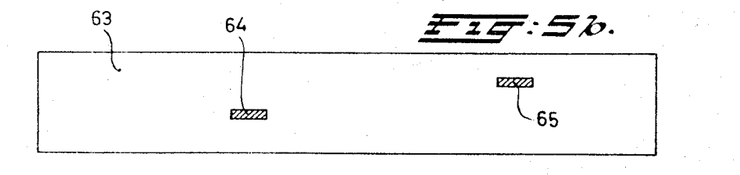
FIG. 5b is a plan view of a special magnets-carrying plate.

The reed switch 17 cooperates with a magnet provided on a special magnet carrying plate 63, represented in FIG. 5b. This plate carries two permanent magnets 64 and 65. When a plate 9 with reed-switches moves over a magnet carrying plate like the plate 63 the magnets 64 and 65 will achieve the simultaneously closing of the reed-switches 14e and 17.

The trolleys of which the selector switches 27, 28 and 29 are set to a non-existing destination are now sorted out as follows:

At various locations along the path a normal magnet carrying plate, like the plate 1, is placed in which plate all magnet positions corresponding to non-existing destinations are filled with permanent magnets. When for example all destinations above the number 500 do not exist, the hundreds positions 5, 6, 7, 8 and 9 in the row 4 are filled, together with the group magnet Gm in row 2. When for example only the stations 260 to 299 inclusive do not exist, the position 2 in column 4, the positions 6, 7, 8 and 9 in column 3 and all positions, except for the group magnet position Gm, in column 2, are filled. As seen, in the direction of movement of the trolleys, a magnet carrying plate 63 is disposed past such a fault selecting magnet carrying plate.

The operation is as follows:

On passing by the fault selecting plate 1 the memory members 18, 19 20 of those trolleys of which the switches are set to a non-existing number will be put into the second condition. Via an AND gate 31 the first input of the AND gate 61 is excited. When thereupon the plate 63 is passed by the reed-switches 14e and 17 will close, whereby also the second input of the AND gate 61 is excited, and the AND gate 61 now emits an output signal to the control member 22 which brings the switches 21a, 21b into the second position. As a consequence the trolley is set to the destination 002. When now the trolley reaches the next points the "wipe out" contact 15f will reset the memory members 18, 19 and 20 to the first condition so that the trolley will exclusively react in the way described hereinbefore to magnetic plates with the code 002.

It has already been stated that the control member 22 has a memory function, e.g., is a relay with a holding contact. The resetting of the memory, e.g., the de-energizing of the relay, is automatically effected when the trolley reaches the destination 002, e.g., because there is a supply rail for charging current and the charging brings about the resetting.

It is furthermore possible to provide a differentiation in the set fixed programming, e.g. via an electronic circuit which can connect the contact 23d with either the output 2, or output 1 of the switch 27. This circuit is excited from the discriminator 53 in such a way that on excitation the contact 23d is connected with the output 1 and the trolleys of which the battery is insufficiently charged go to the destination 001, e.g., a special rail in the postal department. For the sake of clarity this possibility is not shown in the Figure.

FIG. 1 shows finally another possibility to send a trolley of which the battery gets exhausted as fast as possible to a charging station. This possibility can be used for example in an extensive apparatus in a multistory building in which at each story, a charging station is available where the batteries can be charged up in a short time. When this possibility is used the connection 66, indicated in dashed lines in FIG. 1, is made between the discriminator 53 for the battery voltage and the iput 20a of the memory member 20 belonging to the hundreds groups. This means that, when the battery voltage falls below a certain level, the memory member 20, irrespective of the destination at which the trolley is set, is put into the second condition. When the trolley passes group-points with a group magnet Gm (see FIG. 5a), the memory members 18 and 19 will also be brought into the second condition through the reed-switch 16, so that it is certain that the trolley will turn off at the first group points it meets. Thus, by arranging that a station with a possibility for charging is then characterized by a magnet carrying plate in which only the group magnet position Gm is filled in, at this station only a trolley of which the memory member 20 is held via the line 66 in the second condition, which is an indication of an insufficient condition of charge, will branch off. After having been charged the trolley proceeds on its way to the set destination.

Figure 2:
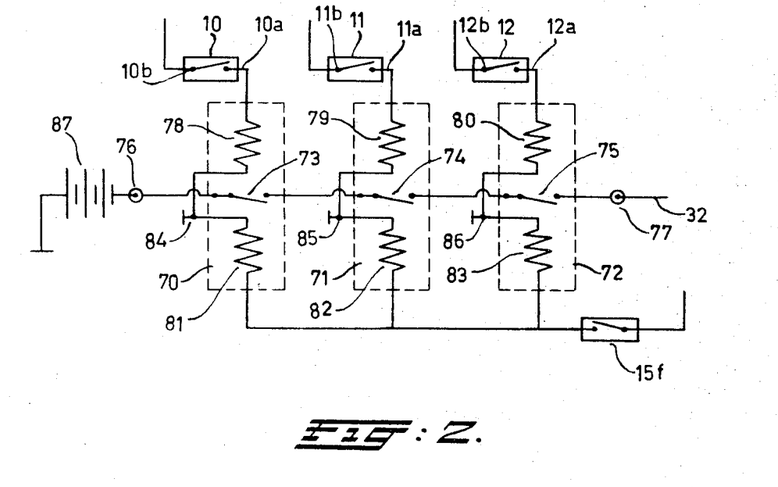
FIG. 2 is a circuit diagram showing connections in a preferred arrangement for the memory members.

Within the scope of the invention it is possible to use for the memory members 18, 19, 20 and 60, the AND gates 31 and 61, and the other control circuits and control members, well-known electrical or electronic components. A simple construction is, however, obtained when the combination of the memory members 18, 19, 20 with the AND gate 31 consists of three polar relays. This is shown in FIG. 2, which will now be described.

The three polar relays 70, 71, 72 are connected in series with their respective contacts 73, 74, 75 between the connections 76 and 77. The first winding 78 of the relay 70 is connected with the reed-switch 10, the first winding 79 of the relay 71 is connected with the reed-switch 11 and the first winding 80 of the reed-switch 72 is connected with the reed-switch 12. The second windings 81, 82, 83 of all three relays are jointly connected with the reed-switch 15f. The common points 84, 85, 86 of the two windings are grounded. The terminal 76 is connected with a source of potential 87. The terminal 77 is connected with the connection 32 leading to the control member 33.

When, via the "wipe out" reed-switch 15f the windings 81, 82, 83 are excited, the contacts 73, 74, 75 will come into the lower position shown. As a consequence the memory members are in the first condition. When, via any of the reed-switches 10, 11 or 12, one of the windings 78, 79 or 80 is excited the relative contact comes into the upper position. The memory member is then in the second condition. When all three contacts 73, 74, 75 are closed there is a closed circuit between the points 76 and 77 and potential from the battery 87 is applied to the connection 32. Thus the three contacts 73, 74 and 75 together act as the AND gate 31.

The advantage of the use of polar relays as compared with electronic memory circuits and the AND-gate 31 is not only in the great simplicity and the low consumption of power but also that, when the supply voltage disappears, the set position is unchanged.

It should be noted that many modifications are possible. Particularly it is pointed out that, although in the foregoing for the sake of simplicity the use of a control signal, which brings the points to the "branch" position is described it is also possible to use two control signals for points "branch" and points "straight" on respectively, whereby the points need not always return to the position straight on. For that purpose a polar relay can be used with change over contacts which act together with one state of the sets of contacts of the control circuit show in FIG. 2, to give the order "branch." The other positions of the contacts, caused by the fact that the relative windings have not been energized, will then together form a closed circuit for the control signal points "straight on."

What I claim is:

1. A system for controlling the direction of a vehicle member along a path comprising:
 at least two code scanning switch members positioned in juxtaposition transverse to the direction of movement of the vehicle;
 a group of selecting switches connected to said code scanning switch members in accordance with a code determining the direction to be taken by said vehicle and forming a control circuit for initiating a path-controlling signal;
 code activating members and at least one position activating member positioned in juxtaposition transverse to the direction of the movement of said vehicle along the path for actuating said code scanning switch members to initiate said path-controlling signal for a particular combination of said code activating members;

selecting switching systems having a number of outputs;

memory means switchable from a first condition to a second condition, said memory means constituting a number of control circuits;

said code scanning switch members are connected to the inputs of said selecting switching systems and to said memory means whereby memory means constituting a given control circuit are switched from said first condition to said second condition by a memory control signal supplied via a representative code scanning switch member and a selecting switching system for generating a path control signal;

a memory control signal source;

position scanning switch members interconnecting said memory control signal source and the mutually corresponding output connections of said selecting switching systems, said position scanning switch members are arranged with respect to said code scanning members to be energized by at least one of said position activating members with movement of said code scanning switch members past said code activating members.

2. A system according to claim 1, wherein an additional reset scanning switch member is coupled to a source for a memory reset signal and is located before the position scanning switch member as defined by the direction of movement of the vehicle for generating a memory reset signal for the memory members when the vehicle passes by the position activating members.

3. A system according to claim 1 wherein the system is coded in a decimal code, the number of the code scanning switch members corresponding to the number of the code decimals.

4. A system according to claim 1 wherein the generated path-controlling signal will act upon a member which determines whether or not the vehicle is to branch off at a branching point in the path.

5. A system according to claim 1 wherein an additional code scanning member is provided which is coupled to the output of one of the position scanning members or to at least one of said memory means and is operated by an additional code activating member which is disposed along the track.

6. A system according to claim 1 wherein that contact of each code scanning member which is not connected with said memory means is connected with the input of a program changeover switch having two outputs, the first of which is connected to the corresponding input of the selecting switching system, the second to one or more arbitrarily selected outputs thereof.

7. A system according to claim 6, further comprising a sensing circuit for sensing the charge level of a battery feeding a driving motor of the vehicle and causes said program change-over switch to move to the second position when the charge level falls below a particular value.

8. A system according to claim 7, wherein the sensing circuit is capable also of supplying a control signal which maintains one of said memory means corresponding to the greatest decimal permanently in the second condition.

9. A system according to claim 6, wherein an additional scanning switch member is disposed before the code scanning members as defined by the direction of movement of said vehicle, said additional member closes a control circuit for causing said program switch to move to the second position when all the memory means for the several decimal places are in the second condition.

10. A system according to claim 6 and used in a vehicle with a closable cargo compartment, wherein means responding to the opening of said compartment is active to cause said program change-over switch to be brought into and held in the second position.

11. A system according to claim 1 wherein each of said memory means constituting a given control circuit comprises a polar relay with two windings, the first winding of each polar relay being connected via the respective code scanning switch member to the input of the respective selector switch system, the second windings of said polar relay are mutually connected in parallel and connected with the reset scanning switch member, while the code scanning switch members are series connected to constitute the control circuit.

12. A system according to claim 1 wherein said position scanning members are arranged in two juxtaposed rows to cooperate with two position activating members arranged in staggered relationship with respect to one another.

13. A system according to claim 1 wherein said scanning switch members are magnetically controllable switches capable of being operated by activating members in the form of permanent magnets.

14. A system according to claim 13, wherein the switches are of the type which in the absence of an influencing magnetic field are open.

15. A system according to claim 1 wherein said path includes switch points, before which, as defined by the direction of movement of the vehicle, are provided plates carrying a number of coding and position magnetic activating members, the mutual spacing of which corresponds with that of said scanning switches on the vehicle.

16. A system according to claim 15 wherein said path further includes a central station along which current supply rails are provided and which cooperate with sliding contacts on the vehicles connected with batteries thereof.

* * * * *